July 19, 1932.  H. W. EAKINS  1,867,910
POP CORN MACHINE
Filed Dec. 26, 1930  2 Sheets-Sheet 1
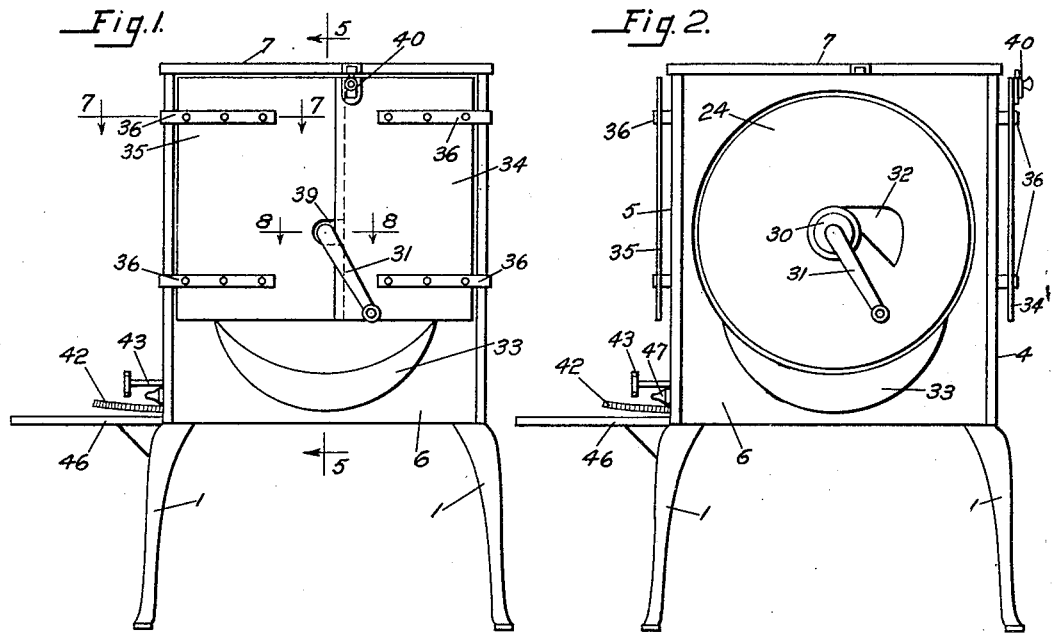
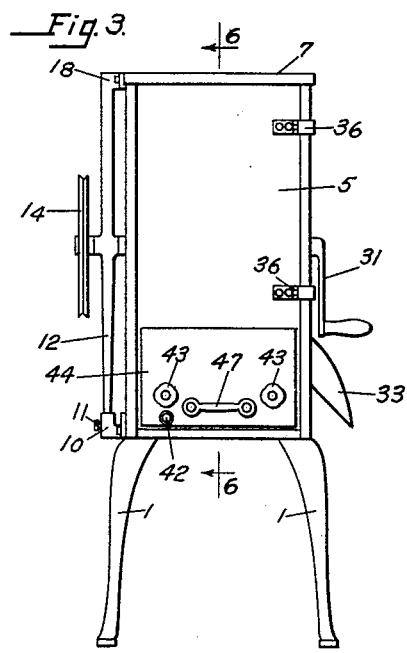
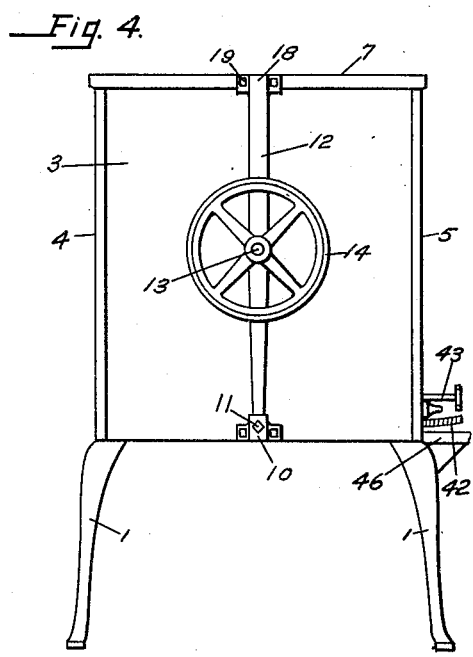
INVENTOR
HERBERT W. EAKINS.
BY Toulmin + Toulmin
ATTORNEY July 19, 1932.  H. W. EAKINS  1,867,910
POP CORN MACHINE
Filed Dec. 26, 1930    2 Sheets-Sheet 2
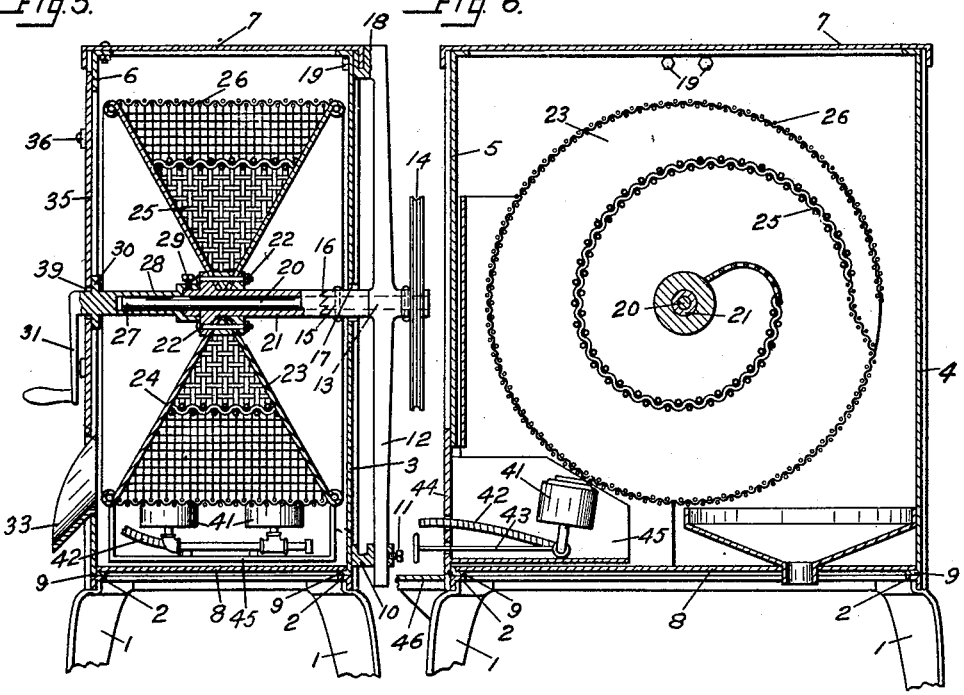
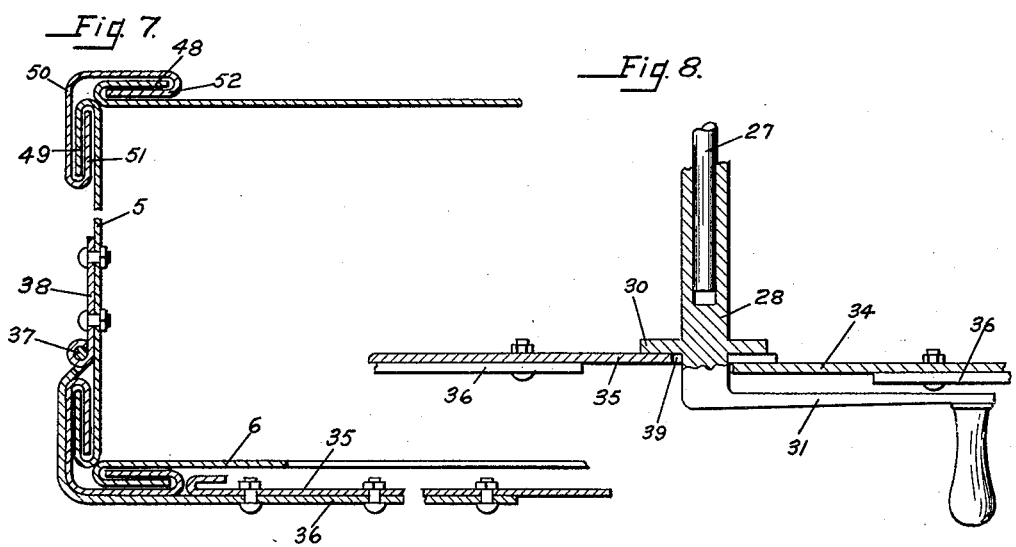
*INVENTOR*
*HERBERT W. EAKINS.*
BY
*Toulmin & Toulmin*
*ATTORNEY*

Patented July 19, 1932

1,867,910

UNITED STATES PATENT OFFICE

HERBERT W. EAKINS, OF SPRINGFIELD, OHIO

POP-CORN MACHINE

Application filed December 26, 1930. Serial No. 504,756.

My invention relates to machines for popping corn.

It is the object of my invention to provide a pop corn machine having one or more of the following novel features singly or in combination:—

(a) A pop corn machine with enclosing doors which enclose the front of the hopper to retain the maximum amount of heat within the hopper, to increase the effectiveness of the heat, and economize the use of heat, while at the same time permitting the free discharge beneath the doors of the pop corn.

(b) The use of the doors to cause the hopper to engage with its rotating means so that the hopper will be operative when the doors are closed and inoperative when the doors are open.

(c) The equipment of the hopper with doors which not only serve to retain the handle and hopper in position but are also arranged so that they can close or open without disturbing the handle on the hopper.

(d) The mounting of the doors so that they can be swung completely around the corners of the hopper and to one side thereof.

(e) The provision of a solid tray for containing the burners that furnish the heat to the hopper, so that they can be completely removed and cleaned and restored to the machine without upsetting the machine, its construction or its operation.

(f) The provision of a novel means of constructing the casing of the hopper and of accommodating the hinges and doors around this construction of the frame, the frame construction being of such a character that it is easily assembled and disassembled without special tools, and is cheaper to manufacture, presents a handsome appearance and retains the heat without undue waste.

Referring to the drawings:

Figure 1 is a front elevation of the corn popper with the doors closed.

Figure 2 is a similar view with the doors swung open through an angle of 90 degrees.

Figure 3 is a side elevation from the burner side.

Figure 4 is a rear elevation.

Figure 5 is a section on the line 5—5 of Figure 1.

Figure 6 is a section on the line 6—6 of Figure 3.

Figure 7 is a section on the line 7—7 of Figure 1.

Figure 8 is a detailed section on the line 8—8 of Figure 1.

Referring to the drawings in detail, 1 indicates the legs supporting the corn popper. A suitable angle-iron bottom frame 2 is mounted upon these legs joining them together and forming a support for the side walls and back as well as the front of the corn popper. The back wall is designated 3, the side walls 4 and 5, the front wall 6 and the top 7. The bottom is designated 8. The bottom rests upon inwardly turned flanges 9 on the walls. The rear wall carries a bracket 10 having a set screw 11 which engages with the frame 12 that serves to carry the driving shaft 13 and its driving pulley 14. The inner end of this shaft is provided with a clutch head 15 having teeth 16 which project through the opening 17 in the rear wall 3.

The upper end of this member 12 is framed in a slotted head 18 which receives the cover 7 therein, and on the inside is carried the upper edge of the rear wall 3 to which it is bolted by bolts 19.

The corn popper hopper is mounted on the clutch sleeve 21 on the end 20 of the driving shaft 13. The sleeve 21 has bolted to it by the bolts 22 side wall discs 23 and 24 which constitute the side walls of the hopper. The exterior of the hopper is enclosed by the successive screens of different mesh designated 25 and 26 for the progressive popping of the corn. The inner end of this sleeve 21 has corrugations in engagement with the corrugations 16 with the other half of the clutch sleeve on the driving shaft designated 15.

This shaft 13 extends outwardly as at 27 to receive the handle sleeve 28 which is flared to receive one end of the sleeve 21 and is attached thereto by the set screw 29. This handle sleeve is provided with a shoulder 30 and a handle 31. The hopper discharges through the opening 32 in the wall 24 beneath the handle, thence into the tapered apron 33 formed on the front wall of the casing to facilitate the discharge of the pop corn. This can take place when the doors 34 and 35 are closed because they do not extend over the discharge apron 33, but it will be noted that the doors do enclose all of the remainder of the hopper and therefore retain the heat within the hopper and within the corn popper as a whole bringing about a more perfect popping of the corn and a great reduction in the amount of heat employed.

The doors 34 and 35 are supported on strap hinges 36 which extend laterally and thence inwardly across the face and along one side of the casing of the popper so as to clear the corner of the popper and to enable the doors to be swung completely out of line with the front of the hopper but parallel to the front.

The hinge pin 37 is located on its supporting strap 38 on the side wall of the popper in the side wall 4 or 5 where it is not subject to injury or damage by the operation of the hopper and the bringing of supplies to the machine.

When the door 35 is closed, the slot 39 in the face of that door clears the handle sleeve 28 and engages with the shoulder 30, and then the door 34 can be swung into position by moving the handle from the door 35 so as to cover the free end of the slot 39 and retain the handle and its sleeve 28 in the position desired, namely, that of operation for the popper. In doing this, the entire hopper with the clutch sleeve 21 is forced rearwardly by the doors engaging the shoulder 30 so that the hopper can be operatively engaged with the driving shaft 13 which is driven by the pulley 14 and a suitable belt driven from some source of power. Thus the closing of the doors places the hopper in operation and the opening of the doors permits the driving shaft to so move the hopper that it will become disengaged from it and come to rest. A suitable latch 40 is provided for locking the door 34 and thereby the door 35, together with the associated mechanism, in operative closed position.

Beneath the hopper is mounted a burner 41 having a supply pipe 42. A control handle 43 is provided, extending outside of the casing through the front 44 of the drawer 45 which carries the burner. The burner is therefore in such a position that it can be moved out bodily with this drawer for cleaning and adjustment. A supporting tray 46 is provided to receive it. The handle 47 is mounted on the drawer to facilitate its withdrawal from the casing.

The casing itself is put together at the corners in this manner: The corner edges are turned over to form loops 48 and 49 with the curved end of these loops abutting one another to form a tight joint. An angular corner piece 50 having end loops 51 and 52 adapted to telescopically engage the corner loops 48 and 49 is dropped down across the junction of the two walls and in relatively tight engagement with them so that a locked joint is formed which provides a decorative corner, while at the same time securely locking, without any other fastening means, the two sheets constituting the walls together.

Nuts, bolts, screws, welding and the like are thus eliminated, although, of course, they can be added, but are not necessary. Such an arrangement greatly facilitates enameling of the structure and assembly and disassembly for either repair or for shipment.

I desire to comprehend within my invention such modifications as may be clearly embraced within the claims and the scope of my invention.

Having thus fully described my invention, what I claim is new and desire to secure by Letters Patent, is:

1. In a corn popper, a casing, a hopper therein having an operative and an inoperative position, means to heat said casing and said hopper, a discharge means from said hopper and doors adapted to close said casing and hopper without closing said discharge means and move and hold the hopper in operative position.

2. In a corn popper, a casing, a hopper therein, means to heat said casing and said hopper and a discharge means from said hopper and doors adapted to close said casing and hopper without closing said discharge, said discharge means being arranged beneath said doors so that the popped corn can discharge from the hopper behind the doors and thence underneath the doors through the discharge means.

3. In combination in a corn popper, of a casing having an open front, a hopper therein, means for heating the hopper, said hopper having one face thereof mounted in the front of the casing and discharging through said front and removable means of closing the front of the casing overlapping said hopper and in spaced relationship thereto, whereby the contents of the hopper may be discharged between said means and the front of the hopper and then beneath said means out of the casing.

4. In combination in a corn popper of a casing, a hopper rotating therein having a recessed front, a front wall of said casing cut away adjacent said recessed front, and doors in said casing adapted to span all of said cut-away portion of the front across said recessed part of the hopper with the exception of a discharge opening beneath the doors in front of the recessed front of the hopper, and a discharge spout mounted on said front beneath said doors.

5. In a corn popper, a casing, a rotating hopper therein, means for heating the hopper, means for driving the hopper, clutch means on the driving means and on the hopper, door engaging means on said hopper, and door means adapted when closed to move said hopper laterally to close said clutch and drive the hopper.

6. In a corn popper, a casing, a rotating hopper therein, means for heating the hopper, means for driving the hopper, clutch means on the driving means and on the hopper, door engaging means on said hopper, and door means adapted when closed to move said hopper laterally to close said clutch to drive the hopper, and a handle on said door engaging means extending through said doors.

7. In a corn popper, a casing, a driving shaft, clutch means thereon, a hopper slidably mounted on said driving shaft, a clutch means attached to said hopper, adapted to engage with the first mentioned clutch means to cause the hopper to turn with the shaft, and means for causing said hopper to move into driving position with said driving means, said means comprising doors.

8. In a corn popper, a casing, means to heat the casing, a rotatable hopper therein, a driving shaft projected therein, a clutch member fastened to said driving shaft, a slidably mounted clutch member mounted on said driving shaft, means to attach said hopper to said slidable clutch member and a handle member attached to said slidable member extending out of said casing, a shoulder on said handle member, and doors mounted on said casing adapted, when closed, to engage said shoulder to cause said clutch members to engage.

9. In a corn popper, a casing, means to heat the casing, a rotatable hopper therein, a driving shaft projected therein, a clutch member fastened to said driving shaft, a slidably mounted clutch member mounted on said driving shaft, means to attach said hopper to said slidable clutch member and a handle member attached to said slidable member extending out of said casing, a shoulder on said handle member, and doors mounted on said casing adapted, when closed, to engage said shoulder to cause said clutch members to engage, said doors being arranged so that said handle will be received through one of said doors, and the other of said doors will over-lap the first mentioned door.

10. In a corn popper, a casing, means to heat the casing, a rotatable hopper therein, a driving shaft projected therein, a clutch member fastened to said driving shaft, a slidably mounted clutch member mounted on said driving shaft, means to attach said hopper to said slidable clutch member and a handle member attached to said slidable member extending out of said casing, a shoulder on said handle member, and doors mounted on said casing adapted, when closed, to engage said shoulder to cause said clutch members to engage, said doors being arranged so that said handle will be received through one of said doors, and the other of said doors will over-lap the first mentioned door, and means to lock said doors.

11. In a corn popper, a casing having a front opening, a hopper rotating within said casing adapted to discharge through the lower portion of said opening, a driving shaft slidably supporting said hopper, a clutch member on said driving shaft, a second clutch member slidable on said driving shaft and forming a part of the hopper, supporting means on said hopper for engaging doors, and doors adapted to close the opening in said hopper except for a small portion for the discharge of the contents of the hopper beneath the doors.

12. In a corn popper, a casing having a front opening, a hopper rotating within said casing adapted to discharge through the lower portion of said opening, a driving shaft slidably supporting said hopper, a clutch member on said driving shaft, a second clutch member slidable on said driving shaft and forming a part of the hopper, supporting means on said hopper for engaging doors, and doors adapted to close the opening in said hopper except for a small portion for the discharge of the contents of the hopper beneath the doors, said doors being arranged to engage said hopper to cause it to rotate with the driving shaft.

13. In a corn popper, a door having a slot in one side of the door, a handle supporting a hopper and having a shoulder thereon for engaging with the interior of the door when the handle projects through said slot and a second door adapted to over-lap the other end of said slot whereby said handle is retained between said doors.

14. In a corn popper, a casing, a shaft rotatably supported by said casing, a clutch member on said shaft, a sleeve on said shaft having means to engage said clutch member, a hopper attached to said sleeve, a door for said casing and operated by the door to force the sleeve into engagement with the clutch member.

15. In a corn popper, a casing, a shaft rotatably supported by said casing, a hopper mounted on said shaft for rotary and sliding movements thereon, a door for said casing, and means operated by the closing of the door to cause the hopper and the shaft to interengage so that the hopper will rotate with the shaft.

16. In a corn popper, a casing, a shaft rotatably supported by said casing, a hopper loosely mounted on said shaft, a door for said casing, and means operated by the closing of the door to cause the hopper and the shaft to interengage so that the hopper will rotate with the shaft.

In testimony whereof, I affix my signature.

HERBERT W. EAKINS.